D. L. SWANK.
AUTOMATIC CAR DUMP MECHANISM.
APPLICATION FILED MAR. 29, 1920.

1,388,388.

Patented Aug. 23, 1921.
2 SHEETS—SHEET 1.

Witness
P.F. Dilworth

Inventor
David L. Swank
By Jack Snyder
Attorney

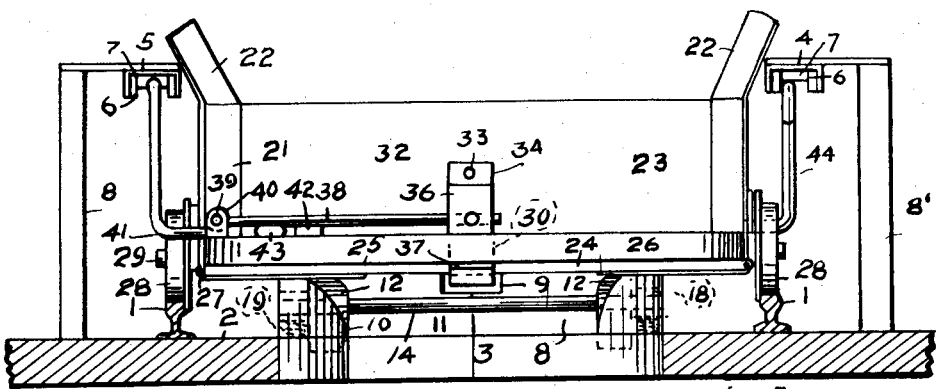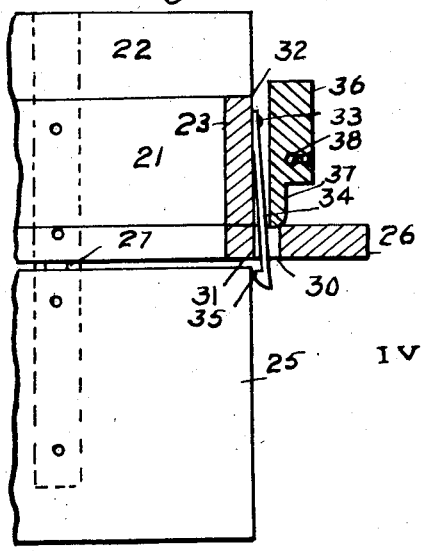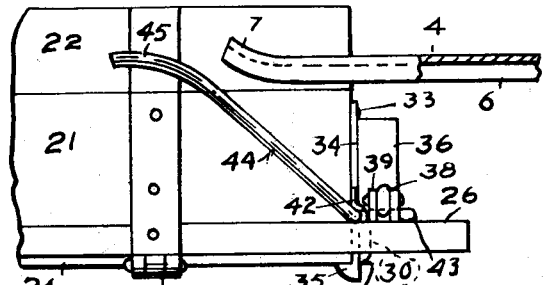

UNITED STATES PATENT OFFICE.

DAVID L. SWANK, OF DAVIDSVILLE, PENNSYLVANIA.

AUTOMATIC CAR-DUMP MECHANISM.

1,388,388.

Specification of Letters Patent. Patented Aug. 23, 1921.

Application filed March 29, 1920. Serial No. 369,535.

*To all whom it may concern:*

Be it known that I, DAVID L. SWANK, a citizen of the United States, residing at Davidsville, in the county of Somerset and State of Pennsylvania, have invented certain new and useful Improvements in Automatic Car-Dump Mechanism, of which the following is a specification.

This invention relates to new and useful improvements in automatic car dump mechanism, particularly adapted for mine cars, and the primary object thereof is to provide a dumping apparatus of the character described, in a manner as hereinafter set forth, whereby the contents of a car may be automatically dumped therefrom, and the dumping elements involved automatically returned to their normal positions after the dumping operation, without interruption in the travel of the car over the tracks.

Further objects of the invention are to provide a device of the class stated, which is simple in its construction and arrangement, strong, durable and efficient in its use and comparatively inexpensive to manufacture.

To the accomplishment of these and such other objects as may hereinafter appear, the invention consists of the novel construction, combination and arrangement of parts herein specifically described and illustrated in the accompanying drawings wherein is shown an embodiment of the invention, but it is to be understood that the device shown is merely illustrative, and that various changes in the form, proportion and minor details of construction may be resorted to without departing from the principle or sacrificing any of the advantages of the invention, which come within the scope of the claims hereunto appended.

In the drawings forming a portion of this specification and wherein like numerals of reference designate corresponding parts throughout the several views:

Fig. 3 is an end view thereof, with the platform shown in cross section.

Fig. 4 is a view on line IV—IV, Fig. 6, but illustrating a bottom section in the dumping position.

Fig. 5 is a fragmentary side view of a car showing the position of the dump lever relative to the dump rail.

Fig. 6 is a fragmentary top view of a car and associated dumping elements.

Referring more in detail to the drawings, my improved car dump mechanism includes a section of railway track comprising the rails 1 suitably secured to and carried by a supporting platform 2, which latter is provided with a longitudinal opening 3, intermediate of the rails 1, through which the contents of the car is adapted to be dumped.

Figure 2:
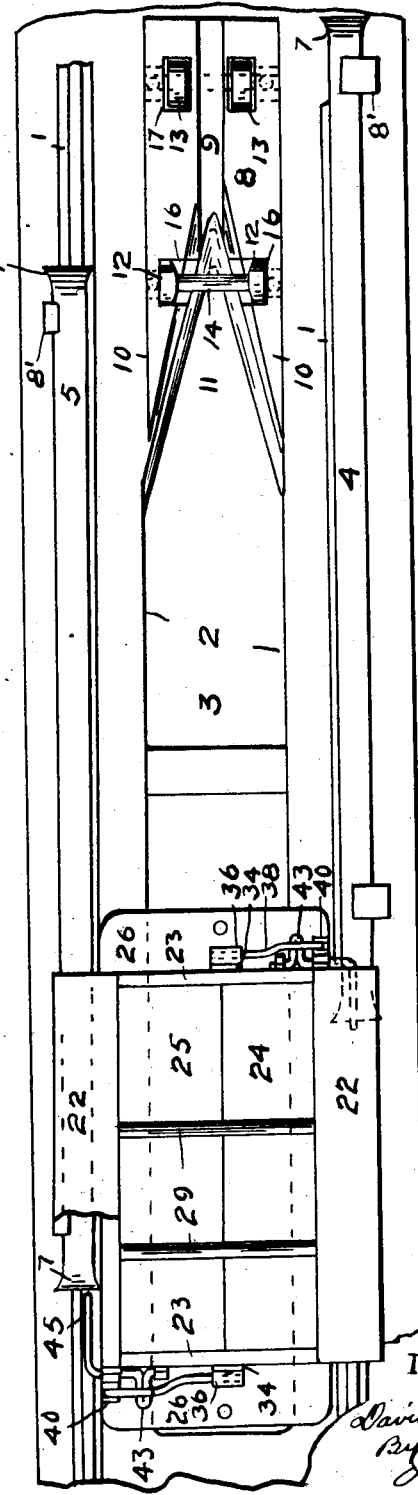
Fig. 2 is a top plan view thereof.

Positioned parallel with and directly over each of the rails 1 is a dump rail 4 and 5, respectively, which is preferably constructed from channel iron and so positioned that the flanges 6 thereof are on the under side or depending. The ends 7 of the dump rails 4 and 5 are curved upwardly with the end edges of the flanges and webs flared outwardly. The dump rails 4 and 5 are suitably supported by the standards 8' fixedly mounted in the platform 2. The dump rail 4 is positioned forward relative to the dump rail 5, as clearly shown in Fig. 2 of the drawings for the purpose hereinafter fully described.

Figure 1:
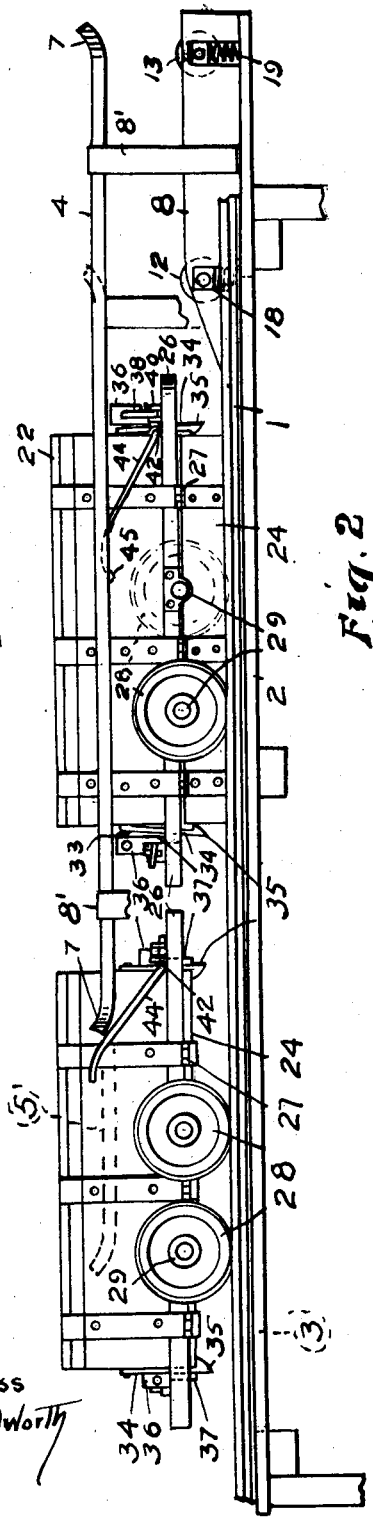
Figure 1 is a side elevation of cars and track provided with the improved dumping mechanism in accordance with this invention.

Fixedly mounted on the platform 2 adjacent to the forward ends of the dump rails 4 and 5 and disposed centrally of the rails 1, is a closing block 8 having a centrally disposed and longitudinally extending groove 9. The top of the block 8 extends considerably above the top of the rails 1, as is shown in Fig. 1. The rear end of the block 8 is formed with a V-shaped cut-out portion providing the rearwardly extending members 10 which converge in the groove 9. The V-shaped cut-out portion of the block 8 is positioned directly over the V-shaped portion 11 of the forward end of the opening 3 in the platform 2. The inner edges of the members 10 are rounded off to flare outwardly at the top of the block 8.

Two pairs of rollers 12 and 13, carried by respective transversely extending shafts 14 and 15, are mounted in the block 8, the former near the rear end of the block 8 and the latter near the forward end thereof. The rollers 12 and 13 are mounted in respective recesses 16 and 17, formed in the top face of the block 8, in such manner that a portion of said rollers normally projects above the top surface of the block 8. The rollers of each pair are disposed on opposite sides of the groove 9 which extends centrally therebetween. Shafts 14 and 15 are suitably journaled in respective bearing blocks 18 which are resiliently seated for vertical movement on spiral springs 19, as shown at 20, in a manner to permit the depression of the shafts and rollers so that the top of the latter will be nearly flush with the top surface of the block 8. Normally, however, the action of the springs 19 will cause the projection of a portion of the rollers above the top surface of the block 8.

The car, used in connection with and forming a part of the dumping mechanism, comprises a body portion consisting of the side members 21 having flared upper portions 22, the end members 23, and the two bottom sections 24 and 25, respectively. The side members 21 and the end members 23 are permanently fixed and secured to a suitable framing structure base 26 which latter projects beyond the rear and forward ends of the body portion of the car. Each of the bottom sections 24 and 25 forms the one-half of the bottom of the car. The sections 24 and 25 are hingedly connected, as at 27, at their outer edges to the lower edges of respective side members 21 in a manner to permit the bottom sections to swing downwardly from the center of the car bottom for dumping the contents from the car. After the dumping operation the bottom sections are adapted to be returned to their normal position to form the bottom of the car.

The car is provided with the wheels 28 and axles 29 of the usual construction. The latter are fixed to the base structure 26 in any suitable manner and extend transversely across the car on the face of the car bottom so as not to interfere with the bottom sections 24 and 25 during the dumping operation.

Each of the projecting ends of the base structure 26 is provided with a centrally disposed transverse slot 30 having its inner wall 31 in alinement with the outer face 32 of the end member 23.

Secured, as at 33, to the outer face 32 of each of the end members 23, is a vertically disposed locking bar 34, which extends through the slot 30 in the base structure 26. The lower end of the locking bar is formed with a flange 35 disposed at right angles with respect to the bar 34 and extending toward the body of the car.

The flange 35, of the bar 34, is adapted to engage the lower faces of the bottom sections 24 and 25 at their corners at the point of juncture with each other, and lock the said bottom sections in the closed position. The locking bar 34 is preferably made from resilient spring steel and is so constructed and attached as to normally hold the flange 35 released or disengaged from the bottom sections 24 and 25, as clearly shown in Fig. 4 of the drawings.

Each of the locking bars 34 with respective flanges 35, forming the latching elements for the bottom sections 24 and 25, is held in position to lock said bottom sections in the closed position by a weight 36 having its lower portion formed to provide a wedge 37, which latter is adapted to be inserted in the slot 30 and engage the outer face of the locking bar 34. The weight 36 is carried at the free end of a transversely extending lever 38 which has its other end pivotally connected, as at 39, in the brackets 40 mounted in proximity to the outer side edge of the projecting ends of the base structure 26.

An operating bar 41 is suitably journaled in the bearings 42 mounted at the lower end on the outer face of the end members 23. An actuating arm 43, carried by the bar 41 and projecting at right angle thereto, is positioned to extend beneath the lever 38 and engage the latter when operated to elevate the weight 36 and in consequence to remove the wedge 37 from the slot 30 and permit the release of the latching elements from the bottom sections 24 and 25.

An angularly disposed dumping lever 44 having a curved free end 45 is formed integrally with the outer end of the operating bar 41, and is so positioned that the free end 45 will engage the under face of the dump rails during the travel of the car over the rails 1.

As a latching element is provided at each end of the car, respective operating mechanism therefor is also carried at each end of the car, the two operating mechanisms being disposed at diagonal corners of the car with respect to each other, to permit the proper operation of the dump mechanism regardless of the direction in which the car is turned upon the rails 1.

In practice the operation of the dump mechanism is as follows: As the loaded car moves forwardly on the rails 1, the dump rail 4 will engage the dump lever at the forward end of the car and the dump rail 5 will engage the dump lever at the rear diagonal corner of the car. The dump rails are so spaced from the rails 1 that they will depress the dump levers, actuating in turn the operating bar 41, the actuating arm 43 and actuate the lever 38 to elevate the wedge 37 from the slot 30. When the wedge 37 is removed from the slot 30 the locking bar 34 will snap back by its own resiliency and release the flange 35 from the lower face of the bottom sections, allowing the said bottom sections to swing downwardly and discharge the load through the opening 3 in the platform 2. As the car continues its travel, the rearwardly extending members 10, of the block 8, will engage the now open bottom sections and gradually close the same as the car is passing over the block 8 on the resiliently supported rollers 12 and 13. As soon as the car has moved sufficiently forward for the dumping levers to clear the respective forward ends of the dump rails 4 and 5, the weight 36 by gravity will have forced the wedge 37 back into the slot 30 and the bottom section will be in the closed condition. The rounded inner edges of the members 10 facilitate this closing operation, and the depending flanges and the flared ends of the dump rails will assure proper engagement of the dump levers with the dump rails. It will be noted that the dumping operation is automatic and continuous during the travel of the cars over the rails.

What I claim is:

1. A car dump mechanism comprising the combination with a car having a dumping bottom and a releasable latching element carried by the car for normally maintaining the bottom closed, of a stationary element adapted to engage and actuate the latching element during the travel of the car to release the dumping bottom to cause discharge of the load, and means for restoring the bottom to the closed position as the car continues its travel, said means including a stationary grooved member provided with two pairs of resiliently supported rollers.

2. A car dump mechanism comprising the combination with a car having a dumping bottom and a releasable latching element at each end thereof for normally maintaining the bottom closed, of a pair of stationary dump rails one extending in advance of the other and adapted to simultaneously engage and actuate respective latching elements during the travel of the car to release the bottom to cause discharge of the load, and means for restoring the bottom to the closed position as the car continues its travel, said means including a stationary grooved member provided with two pairs of resiliently supported rollers.

In testimony whereof I affix my signature.

DAVID L. SWANK.